United States Patent
Han (10) Patent No.: US 11,215,132 B1
(45) Date of Patent: Jan. 4, 2022

(54) CONTROLLING AN INTERNAL COMBUSTION ENGINE SYSTEM

(71) Applicant: Woodward, Inc., Fort Collins, CO (US)

(72) Inventor: Yi Han, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/122,154

(22) Filed: Dec. 15, 2020

(51) Int. Cl.
  *F02D 41/14* (2006.01)
  *F02D 41/18* (2006.01)
  *F02D 41/00* (2006.01)

(52) U.S. Cl.
  CPC ....... *F02D 41/182* (2013.01); *F02D 41/0002* (2013.01); *F02D 41/1445* (2013.01); *F02D 41/1446* (2013.01); *F02D 41/1448* (2013.01); *F02D 41/1454* (2013.01); *F02D 41/1473* (2013.01); *F02D 2200/0404* (2013.01); *F02D 2200/0414* (2013.01)

(58) Field of Classification Search
  CPC ............... F02D 41/182; F02D 41/1448; F02D 41/1445; F02D 41/1446; F02D 41/1473; F02D 41/1454; F02D 41/0002; F02D 2200/0404; F02D 2200/0414
  USPC ............. 123/435, 436, 399, 672, 676, 683, 123/568.19, 568.2, 568.21; 701/103–105, 701/108, 109; 73/114.32, 114.33, 114.34, 73/114.36, 114.37, 114.74
  See application file for complete search history.

(56) References Cited

U.S. PATENT DOCUMENTS

| 2,354,179 | A |   | 7/1944  | Blanc |
| 3,680,534 | A |   | 8/1972  | Chavant |
| 4,069,797 | A |   | 1/1978  | Nohira et al. |
| 4,174,027 | A | * | 11/1979 | Nakazumi ............. F02M 26/57 477/181 |
| 4,183,333 | A |   | 1/1980  | Aoyama |
| 4,203,400 | A |   | 5/1980  | Yorioka |
| 4,249,503 | A |   | 2/1981  | Noguchi et al. |
| 4,271,795 | A |   | 6/1981  | Nakagawa et al. |

(Continued)

FOREIGN PATENT DOCUMENTS

| CN | 202125377 | 1/2012 |
| CN | 103306858 | 9/2013 |

(Continued)

OTHER PUBLICATIONS

Chinese Office Action in CN Appln. No. 201721556484.3, dated May 14, 2018, 3 pages.

(Continued)

*Primary Examiner* — Hai H Huynh
(74) *Attorney, Agent, or Firm* — Fish & Richardson P.C.

(57) ABSTRACT

A first pressure upstream of a throttle is received. A temperature upstream of the throttle is received. A throttle position is received. A second pressure at a convergent end of a convergent nozzle positioned downstream of the throttle is received. An air flow is estimated based on the received first pressure, the received temperature, the received throttle position, and the received second pressure, wherein estimating the air flow includes determining one or more models to use for calculating air flow based on the throttle position, the models including a throttle flow model, a convergent nozzle flow model, or both.

20 Claims, 5 Drawing Sheets

(56) References Cited

U.S. PATENT DOCUMENTS

| | | |
|---|---|---|
| 5,611,203 A | 3/1997 | Henderson et al. |
| 5,611,204 A | 3/1997 | Radovanovic et al. |
| 5,974,802 A | 11/1999 | Blake |
| 6,003,316 A | 12/1999 | Baert et al. |
| 6,216,458 B1 | 4/2001 | Alger et al. |
| 6,267,106 B1 | 7/2001 | Feucht |
| 6,343,594 B1 | 2/2002 | Koeslin et al. |
| 6,408,833 B1 | 6/2002 | Faletti |
| 6,425,382 B1 | 7/2002 | Marthaler et al. |
| 6,470,864 B2 | 10/2002 | Kim et al. |
| 6,609,373 B2 | 8/2003 | Coleman et al. |
| 6,609,374 B2 | 8/2003 | Feucht et al. |
| 6,640,542 B2 | 11/2003 | Coleman et al. |
| 6,659,092 B2 | 12/2003 | Coleman et al. |
| 6,729,133 B1 | 5/2004 | Sorter et al. |
| 6,732,524 B2 | 5/2004 | Sponton |
| 6,776,146 B1 | 8/2004 | Ricart-Ugaz et al. |
| 6,810,725 B2 | 11/2004 | Henderson et al. |
| 6,880,535 B2 | 4/2005 | Sorter et al. |
| 6,886,544 B1 | 5/2005 | Bui |
| 6,983,645 B2 | 1/2006 | Webb et al. |
| 7,032,578 B2 | 4/2006 | Liu et al. |
| 7,040,305 B2 | 5/2006 | Sponton |
| 7,140,874 B2 | 11/2006 | Ingalls, Jr. et al. |
| 7,175,422 B2 | 2/2007 | Webb et al. |
| 7,178,492 B2 | 2/2007 | Coleman et al. |
| 7,191,743 B2 | 3/2007 | Weber et al. |
| 7,212,926 B2 | 5/2007 | Ingalls, Jr. et al. |
| 7,252,077 B2 | 8/2007 | Berggren |
| 7,261,096 B2 * | 8/2007 | Berggren ............... F02D 9/12 123/568.17 |
| 7,277,801 B2 | 10/2007 | Webb et al. |
| 7,281,530 B2 | 10/2007 | Usei |
| 7,299,137 B2 | 11/2007 | Bartley et al. |
| 7,311,090 B2 | 12/2007 | Lyons |
| 7,322,193 B2 | 1/2008 | Bering et al. |
| 7,347,086 B2 | 3/2008 | Webb et al. |
| 7,389,770 B2 | 6/2008 | Bertilsson et al. |
| 7,412,335 B2 | 8/2008 | Anderson et al. |
| 7,426,923 B2 * | 9/2008 | Berggren ......... F02M 35/10262 123/568.18 |
| 7,550,126 B2 | 6/2009 | Webb et al. |
| 7,552,722 B1 | 6/2009 | Shieh |
| 7,578,179 B2 | 8/2009 | Krueger et al. |
| 7,597,016 B2 | 10/2009 | Timmons et al. |
| 7,669,411 B2 | 3/2010 | Mallampalli et al. |
| 7,712,314 B1 | 5/2010 | Barnes et al. |
| 7,748,976 B2 | 7/2010 | Burrahm et al. |
| 7,833,301 B2 | 11/2010 | Schindler et al. |
| 7,854,118 B2 | 12/2010 | Vetrovec |
| 7,886,727 B2 | 2/2011 | Ulrey |
| 7,934,492 B2 | 5/2011 | Gerum |
| 8,047,185 B2 | 11/2011 | Ulrey et al. |
| 8,056,340 B2 | 11/2011 | Vaught et al. |
| 8,061,120 B2 | 11/2011 | Hwang |
| 8,425,224 B2 | 4/2013 | Webb et al. |
| 8,821,349 B2 | 9/2014 | Cunningham et al. |
| 9,051,900 B2 | 6/2015 | Regner |
| 9,074,540 B2 * | 7/2015 | Subramanian ...... F02D 41/0072 |
| 9,239,034 B2 | 1/2016 | Cunningham et al. |
| 9,303,557 B2 | 4/2016 | Ulrey et al. |
| 9,309,837 B2 | 4/2016 | Ulrey et al. |
| 9,448,091 B2 | 9/2016 | Woodsend |
| 9,488,098 B2 | 11/2016 | Sponsky |
| 9,546,591 B2 | 1/2017 | Ge |
| 9,651,004 B2 | 5/2017 | Zhang |
| 9,695,785 B2 | 7/2017 | Roth et al. |
| 9,759,150 B2 * | 9/2017 | Ohori ............... F02M 61/145 |
| 9,816,466 B2 | 11/2017 | Roth et al. |
| 9,863,371 B2 | 1/2018 | El Gammal et al. |
| 10,036,353 B2 | 7/2018 | Shuto et al. |
| 10,316,803 B2 | 6/2019 | Hampson |
| 10,465,637 B2 * | 11/2019 | Beyer ............ F02M 35/10222 |
| 10,634,099 B2 | 4/2020 | Hampson |
| 10,731,580 B2 * | 8/2020 | Surnilla ............ F02D 41/0072 |
| 2003/0111065 A1 | 6/2003 | Blum |
| 2004/0173192 A1 | 9/2004 | Sorter et al. |
| 2005/0247284 A1 | 11/2005 | Weber et al. |
| 2006/0021346 A1 | 2/2006 | Whelan et al. |
| 2006/0124116 A1 * | 6/2006 | Bui ............... F02M 26/08 123/568.18 |
| 2006/0168958 A1 | 8/2006 | Vetrovec |
| 2007/0039321 A1 | 2/2007 | Sheidler |
| 2010/0300413 A1 | 12/2010 | Ulrey et al. |
| 2011/0265772 A1 | 11/2011 | Teng |
| 2012/0180478 A1 | 7/2012 | Johnson et al. |
| 2013/0276766 A1 | 10/2013 | Rajkumar |
| 2013/0319381 A1 | 12/2013 | Piaz |
| 2014/0224232 A1 | 8/2014 | Hotta |
| 2014/0238364 A1 | 8/2014 | Beyer et al. |
| 2015/0047317 A1 | 2/2015 | Ulrey et al. |
| 2015/0047618 A1 | 2/2015 | Ulrey et al. |
| 2015/0059713 A1 | 3/2015 | Forshier |
| 2015/0083085 A1 | 3/2015 | Ravenhill et al. |
| 2015/0267650 A1 | 9/2015 | Siuchta et al. |
| 2015/0285192 A1 | 10/2015 | Roth et al. |
| 2015/0369126 A1 | 12/2015 | Knopfel et al. |
| 2016/0319778 A1 | 11/2016 | Shuto et al. |
| 2017/0022941 A1 | 1/2017 | Mallard |
| 2017/0030305 A1 | 2/2017 | Sugiyama |
| 2017/0058839 A1 | 3/2017 | El Gammal et al. |
| 2017/0306899 A1 | 10/2017 | Sanami |
| 2019/0093604 A1 | 3/2019 | Hampson |
| 2019/0257274 A1 | 8/2019 | Hampson |
| 2020/0256266 A1 | 8/2020 | Mastbergen |

FOREIGN PATENT DOCUMENTS

| | | |
|---|---|---|
| CN | 103397959 | 11/2013 |
| CN | 203335295 | 12/2013 |
| CN | 203499859 | 3/2014 |
| CN | 204386776 | 6/2015 |
| CN | 207920739 | 9/2018 |
| DE | 181618 | 3/1907 |
| DE | 19587578 | 6/1999 |
| DE | 10054264 | 5/2002 |
| EP | 0653559 | 5/1995 |
| EP | 0732490 | 9/1996 |
| EP | 1020632 B1 | 7/2000 |
| EP | 1859128 B1 | 7/2008 |
| EP | 2562397 | 2/2013 |
| FR | 2902466 | 12/2007 |
| FR | 2893988 B1 | 1/2008 |
| GB | 2313623 | 12/1997 |
| GB | 2356223 | 5/2001 |
| GB | 2421543 | 6/2006 |
| GB | 2438360 | 11/2007 |
| JP | H 09195860 | 7/1997 |
| JP | H 10131742 | 5/1998 |
| JP | H 11324812 | 11/1999 |
| JP | 2000097111 | 4/2000 |
| JP | 2000230460 | 8/2000 |
| JP | 2002221103 | 8/2002 |
| JP | 2004100508 | 4/2004 |
| JP | 2005147010 | 6/2005 |
| JP | 2005147011 | 6/2005 |
| JP | 2005147030 | 6/2005 |
| JP | 2005147049 | 6/2005 |
| JP | 2006132373 | 5/2006 |
| JP | 2007092592 | 4/2007 |
| JP | 2009299591 | 12/2009 |
| JP | 2010101191 | 5/2010 |
| JP | 2013087720 | 5/2013 |
| JP | 2013113097 | 6/2013 |
| JP | 2013170539 | 9/2013 |
| JP | 5530267 | 6/2014 |
| JP | 5916335 | 5/2016 |
| JP | 5935975 | 6/2016 |
| JP | 5938974 | 6/2016 |
| JP | 6035987 | 11/2016 |

(56) References Cited

FOREIGN PATENT DOCUMENTS

JP            6051881     12/2016
WO    WO2015069330    5/2015

OTHER PUBLICATIONS

PCT International Search Report and Written Opinion in International Appln. No. PCT/US2018/052637, dated Dec. 21, 2018, 6 pages.
PCT International Search Report and Written Opinion in International Appln. No. PCT/US2020/017155, dated May 27, 2020, 14 pages.

* cited by examiner

CONTROLLING AN INTERNAL COMBUSTION ENGINE SYSTEM

TECHNICAL FIELD

This disclosure relates to controlling an internal combustion system.

BACKGROUND

When controlling an internal combustion engine, an accurate air flow and/or pressure of air going into the engine is determined to accurately calculate the fuel needed for a target air-fuel ratio (AFR). In some instances, engines are designed to run with an AFR being at a stoichiometric AFR, a lean AFR (excess air), or rich AFR (excess fuel). Common ways to determine such air flow and/or pressure include using a mass airflow sensor (MAF), a manifold absolute pressure sensor (MAP), or a combination of the two. Accurately adding fuel to achieve a target AFR is useful for reducing NOx emissions.

SUMMARY

This disclosure describes technologies relating to controlling an internal combustion system.

An example implementation described within this disclosure is a method of controlling an internal combustion engine system. The method includes the following features. A value of a first pressure upstream of a throttle is received. A value of a temperature upstream of the throttle is received. A value of a throttle position is received. A value of a second pressure at a convergent end of a convergent nozzle positioned downstream of the throttle is received. An air flow is estimated based on the received first pressure, the received temperature, the received throttle position, and the received second pressure, wherein estimating the air flow includes determining one or more models to use for calculating air flow based on the throttle position, the models including a throttle flow model, a convergent nozzle flow model, or both.

An aspect of the example method, which can be combined with the example method alone or with other aspects, includes the following. Estimating the air flow includes calculating an air flow based on the throttle flow model using the received first pressure, the received temperature, and the received throttle position.

An aspect of the example method, which can be combined with the example method alone or with other aspects, includes the following. Estimating the air flow includes calculating an air flow based on the convergent nozzle flow model using the received first pressure, the received temperature, the received second pressure, and the received throttle position.

An aspect of the example method, which can be combined with the example method alone or with other aspects, includes the following. Determining which model to use includes determining a ratio of a throttle flow model to a convergent nozzle flow model based on the throttle position.

An aspect of the example method, which can be combined with the example method alone or with other aspects, includes the following. Estimating the air flow includes calculating an air flow based on the throttle flow model using the received first pressure and the received temperature. Estimating the air flow includes calculating an air flow based on the convergent nozzle flow model using the received first pressure and the received temperature. Estimating the air flow includes blending the calculated air flows of the throttle flow model and the convergent nozzle flow model based on the determined ratio. an estimated air flow is determined based on the blended calculated air flows.

An aspect of the example method, which can be combined with the example method alone or with other aspects, includes the following. A third pressure, corresponding to a pressure at a throat of a convergent-divergent nozzle downstream of the convergent nozzle, is received. A fourth pressure, corresponding to a pressure downstream of the convergent-divergent nozzle, is received. A combined air flow, recirculated exhaust gas flow, and fuel flow is determined based on the third pressure stream and the fourth pressure stream.

An aspect of the example method, which can be combined with the example method alone or with other aspects, includes the following. An amount of fuel is injected into an intake fluid stream. The amount of fuel is based on the estimated air flow, the combined air flow and recirculated gas exhaust flow, a target air-fuel ratio, or a combination.

An aspect of the example method, which can be combined with the example method alone or with other aspects, includes the following. An amount of recirculated exhaust gas is injected into an intake fluid stream. The amount of recirculated exhaust gas is at least partially determined based on the estimated air flow.

An aspect of the example method, which can be combined with the example method alone or with other aspects, includes the following. A differential pressure across the throttle is calculated based on the received first pressure, the received temperature, and the received throttle position.

An example implementation described within this disclosure is an engine system that includes the following features. An intake manifold is configured to receive a combustible mixture configured to be combusted within a combustion chamber. A throttle is upstream of the intake manifold. The throttle is configured to at least partially regulate an air flow into the intake manifold. An exhaust manifold is configured to receive combustion products from the combustion chamber. An exhaust gas recirculation mixer system is downstream of the throttle and upstream of an intake manifold. The exhaust gas recirculation mixer includes an exhaust gas housing with an exhaust gas inlet into an interior of the exhaust gas housing. A convergent nozzle is in a mixer housing and is in a flow path from an air inlet of the mixer to an outlet of the mixer. The convergent nozzle converges toward the outlet of the mixer. A first pressure port is upstream of the throttle. The first pressure port provides a location to sense a first pressure upstream of the throttle. A second pressure port is at a convergent end of the convergent nozzle. The second pressure port provides a location to sense a second pressure at the convergent end of the convergent nozzle. A controller is configured to receive a first pressure stream from a first pressure sensor at the first pressure port. The first pressure stream corresponds to a first pressure upstream of a throttle. The controller is configured to receive a temperature stream from a temperature sensor at the first pressure port. The temperature stream corresponds to a temperature upstream of the throttle. The controller is configured to receive a throttle position stream from an encoder coupled to the throttle. The throttle position stream corresponds to a throttle position. The controller is configured to receive a second pressure stream from a second pressure sensor at the second pressure port. The second pressure stream corresponds to a second pressure at the convergent end of the convergent nozzle. The controller is configured to estimate an air flow based on the first pressure stream, the temperature stream, the throttle position stream, and the second pressure stream.

An aspect of the example engine system, which can be combined with the example engine system alone or with other aspects, includes the following. The controller is further configured to estimate the air flow with the following steps. A blending ratio of a throttle flow model to a convergent nozzle flow model is determined based on the throttle position stream. An air flow is calculated based on the throttle flow model using the first pressure stream, the throttle position stream, and the temperature stream. An air flow is calculated based on the convergent nozzle flow model using the first pressure stream, the second pressure stream, and the temperature stream. The calculated air flows of the throttle flow model and the convergent nozzle flow model are blended based on the determined blending ratio. An estimated airflow based on the blended calculated air flows is determined.

An aspect of the example engine system, which can be combined with the example engine system alone or with other aspects, includes the following. The temperature stream is a first temperature stream. The controller is further configured to receive a fifth pressure stream corresponding to a pressure upstream of an exhaust gas inlet. The controller is further configured to receive a second temperature stream corresponding to a temperature upstream of an exhaust gas inlet. The controller is further configured to send a signal to an exhaust gas recirculation valve. The signal corresponds to an amount of recirculated exhaust gas to inject into an intake fluid stream. The amount of recirculated exhaust gas being at least partially determined based on the estimated air flow.

An aspect of the example engine system, which can be combined with the example engine system alone or with other aspects, includes the following. A convergent-divergent nozzle is in the mixer housing and includes an air-exhaust gas inlet in fluid communication to receive fluid flow from the convergent nozzle and from the interior of the exhaust gas housing. A third pressure port is in a throat of the convergent-divergent nozzle. The third pressure port provides a location to sense a third pressure within the throat of the convergent-divergent nozzle. A fourth pressure port is downstream of the convergent-divergent nozzle. The fourth pressure port provides a location to sense a third pressure downstream of the convergent-divergent nozzle. The controller is further configured to receive a third pressure stream from a third pressure sensor located at the third pressure port. The third pressure stream corresponds to a third pressure at the throat of the convergent-divergent nozzle. The controller is further configured to receive a fourth pressure stream from a fourth pressure sensor located at the fourth pressure port. The fourth pressure stream corresponds to a fourth pressure downstream of the convergent-divergent nozzle. The controller is further configured to determine a combined air flow, recirculated exhaust gas flow, and fuel flow based on the third pressure stream and the fourth pressure stream.

An aspect of the example engine system, which can be combined with the example engine system alone or with other aspects, includes the following. The controller is further configured to send a signal to a fuel injector. The signal corresponds to an amount of fuel to inject into an intake fluid stream. The amount of fuel is at least partially based on the estimated air flow, the combined air flow and recirculated gas exhaust flow, a target air-fuel ratio, or a combination.

An example implementation of the subject matter within this disclosure is an engine system controller configured to perform the following steps. A first pressure stream, corresponding to a first pressure upstream of a throttle, is received by the controller. A temperature stream, corresponding to a temperature upstream of the, throttle is received by the controller. A throttle position stream corresponding to a throttle position is received by the controller. A second pressure stream, corresponding to a second pressure at a convergent end of a convergent nozzle positioned downstream of the throttle, is received by the controller. One or more models to use for calculating air flow based on the throttle position are determined by the controller. The models include a throttle flow model, a convergent nozzle flow model, or both. an air flow is estimated by the controller based on the one or more determined models.

An aspect of the example engine system controller, which can be combined with the example engine system controller alone or with other aspects, includes the following. To determine the one or more models to use for calculating air flow comprises, the controller is further configured to perform the following steps. The controller determines a ratio of a throttle flow model to a convergent nozzle flow model based on the throttle position stream. The controller calculates an air flow based on a throttle flow model using the first pressure stream, the temperature stream, and the throttle position stream. The controller calculates an air flow based on a convergent nozzle flow model using the first pressure stream, the second pressure stream, and the temperature stream. The controller blends the calculated air flows of the throttle flow model and the convergent nozzle flow model based on the determined ratio. The controller determines an estimated airflow based on the blended calculated air flows.

An aspect of the example engine system controller, which can be combined with the example engine system controller alone or with other aspects, includes the following. The controller is further configured to receive a third pressure stream from a third pressure sensor. The third pressure stream corresponds to a third pressure at a throat of a convergent-divergent nozzle downstream of the convergent nozzle. The controller is further configured to receive a fourth pressure stream from a fourth pressure sensor. The fourth pressure stream corresponds to a fourth pressure downstream of the convergent-divergent nozzle. The controller is further configured to determine a combined air flow, recirculated exhaust gas flow, and fuel flow based on the third pressure stream and the fourth pressure stream.

An aspect of the example engine system controller, which can be combined with the example engine system controller alone or with other aspects, includes the following. The controller is further configured to send a signal to a fuel injector. The signal corresponds to an amount of fuel to inject into an intake fluid stream. The amount of fuel is based on the estimated air flow, the combined air flow and recirculated gas exhaust flow, a target air-fuel ratio, or a combination.

An aspect of the example engine system controller, which can be combined with the example engine system controller alone or with other aspects, includes the following. The temperature stream is a first temperature stream. The controller is further configured to receive a fifth pressure stream corresponding to a pressure upstream of an exhaust gas recirculation valve. The controller is further configured to receive a second temperature stream corresponding to a temperature upstream of the exhaust gas recirculation valve. The controller is further configured to send a signal to the exhaust gas recirculation valve. The signal corresponds to an amount of recirculated exhaust gas to inject into an intake fluid stream. The amount of recirculated exhaust gas is at least partially determined based on the estimated air flow, the fifth pressure stream, the second temperature stream, or a combination.

An aspect of the example engine system controller, which can be combined with the example engine system controller alone or with other aspects, includes the following. The controller is further configured to calculate a differential pressure across the throttle based on the first pressure stream, the temperature stream, and the throttle position stream.

The details of one or more implementations of the subject matter are set forth in the accompanying drawings and the description below. Other features, objects, and advantages of the subject matter will be apparent from the description and drawings, and from the claims.

DESCRIPTION OF DRAWINGS

Like reference numbers and designations in the various drawings indicate like elements.

DETAILED DESCRIPTION

During transient engine operation, it is difficult to accurately control the air-fuel ratio (AFR) that is going into the engine. Controlling the engine's AFR is critical to engine performance and emissions during all operating conditions. For example, in a typical solution, the throttle flow is estimated with engine port flow by using the standard speed-density equation with a transient compensation table. Such a method does not utilize the correct physical models, which results in higher associated engineering cost and a solution that is not as robust to transient conditions. In addition, after treatment costs can also be higher with such methods. The method of finding throttle flow by using isentropic flow (e.g., with orifice mass flow equation or an elliptical approximation of this equation) is also sometimes used; however, this solution is known to be less accurate and less stable when the delta pressure (dP) across the valve is low. In some instances, such issues are caused by pressure sensor inaccuracies. Alternatively or in addition, such an isentropic flow model can result in inaccuracies when the valve is operated near the closed position (e.g., when the throttle is in the closed to 10% open range). In some instances, such issues are caused by a large change of effective area for a small change in position combined with position sensor inaccuracies, part-to-part variations and leakage paths when the valve is near a closed position, pressure sensor inaccuracies, or any combination of these discrepancies.

This disclosure relates to controlling an internal combustion engine system. A pressure and temperature are detected upstream of a throttle valve. The throttle position itself is measured. Based on these measurements, an estimated pressure drop across the throttle, in certain instances, is calculated using a throttle model specific to the throttle. Downstream of the throttle is an EGR mixer that includes a convergent nozzle. A pressure is detected at the convergent end of the convergent nozzle. Based on the pressure and temperature detected upstream of the throttle valve, the detected throttle position, and the pressure detected at the convergent end of the convergent nozzle, an air flow, in certain instances, is estimated with great accuracy, including during transient conditions. This is done by determining one or more models to use for calculating air flow based on the throttle position. The selected models, in certain instances, include a throttle flow model, a convergent nozzle flow model, or both. In instances where both models are used, they are weighted based on the throttle position or pressure drop. Ideally, the estimated airflow should correlate to a calculable MAP that is equal to the MAP detected by a MAP sensor. In some instances, when the calculated MAP and the detected MAP do not equal one-another, a compensation table or equation is used to correct for the disagreement.

Figure 1:
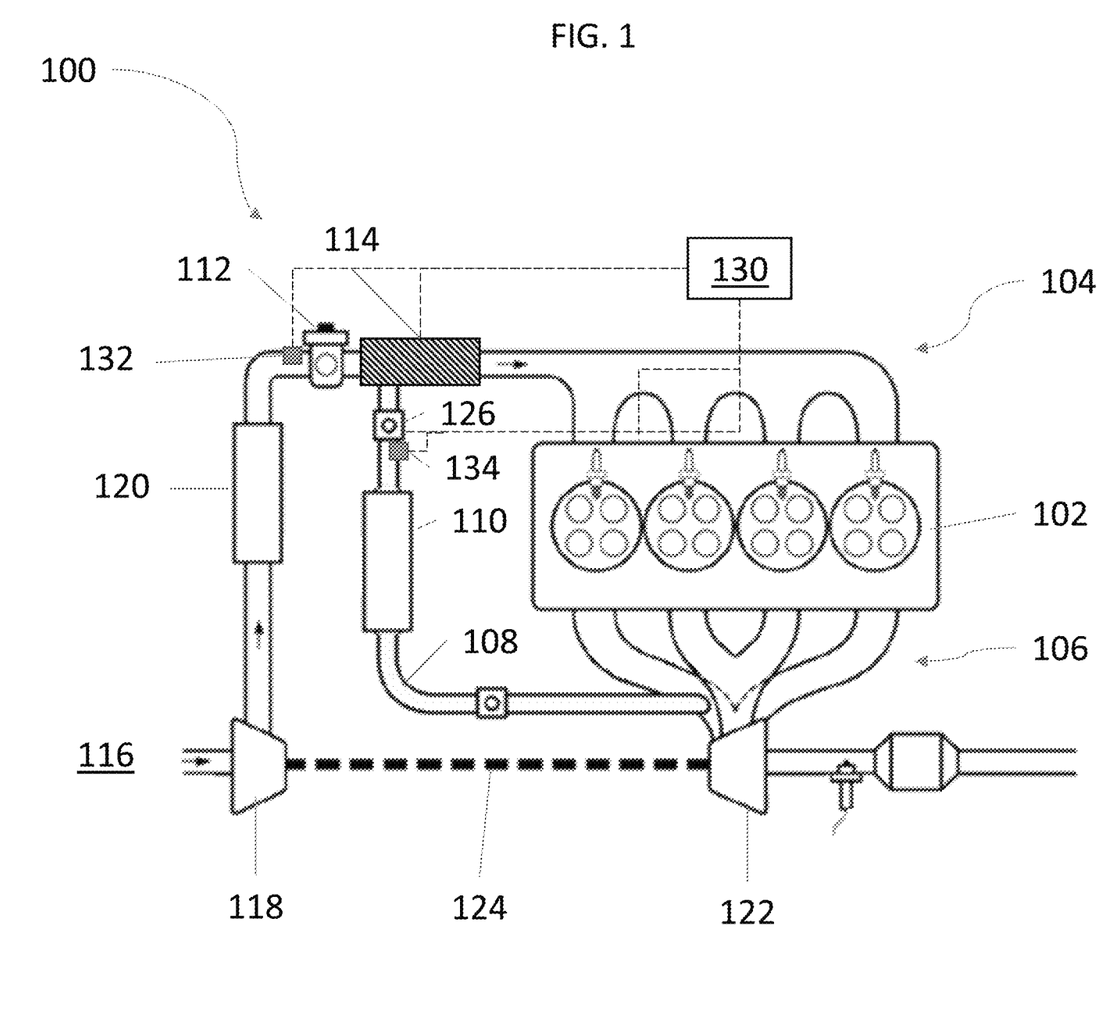
FIG. 1 is a schematic diagram of an example internal combustion engine system.

FIG. 1 shows an example engine system 100. The engine system 100 includes an intake manifold 104 configured to receive a combustible mixture to be combusted within a combustion chamber of the engine block 102. That is, the intake manifold 104 is fluidically coupled to a source of oxygen and a source of fuel. The combustible mixture includes air and any combustible fluid, such as natural gas, atomized gasoline, or atomized diesel. While the illustrated implementation includes a four-cylinder engine block 102, any number of cylinders can be used. Also, while the illustrated implementation includes a piston engine block 102, aspects of this disclosure can be applied to other types of internal combustion engines, such as rotary engines, or gas turbine engines.

A throttle 112 is positioned upstream of the intake manifold 104 and an EGR mixer 114. The throttle 112 is configured to regulate air flow into the intake manifold 104 from the ambient environment 116, for example, by changing a cross-sectional area of a flow passage going through the throttle 112. It should be noted that the intake manifold may experience boosted conditions. That is, pressure at the throttle may be greater that pressure in the ambient environment 116. In some implementations, the throttle 112 includes a butterfly valve or a disc valve. Reducing the cross-sectional area of the flow passage through the throttle 112 reduces the flowrate of air flowing through the throttle 112 towards the intake manifold 104. A combination temperature and pressure sensor 132 is positioned just upstream of the throttle 112. This combination temperature and pressure sensor 132 detects the pressure and temperature of the air flow upstream of the EGR throttle valve 126. While primarily described throughout this disclosure as a combined sensor, separate, discrete sensors, in some implementations, are used in lieu of the combination temperature and pressure sensor 132.

An exhaust manifold 106 is configured to receive combustion products (exhaust) from a combustion chamber of the engine block 102. That is, the exhaust manifold 106 is fluidically coupled to an outlet of the combustion chamber. An EGR flow passage 108 or conduit fluidically connects the exhaust manifold 106 and the intake manifold 104. In the illustrated implementation, an EGR throttle valve 126 is located within the EGR flow passage 108 between the exhaust manifold 106 and the intake manifold 104 and is used to regulate the EGR flow. The EGR throttle valve 126 regulates the EGR flow by adjusting a cross-sectional area of the EGR flow passage 108 going through the EGR throttle valve 126. In some implementations, the EGR throttle valve 126 includes a butterfly valve, a disc valve, a needle valve, or another valve style. Upstream of the EGR throttle valve 126 is a combination temperature and pressure sensor 134. This sensor detects the pressure and temperature of the EGR gas upstream of the EGR throttle valve 126. While primarily described throughout this disclosure as a combined sensor, separate, discrete sensors, in some implementations, are used in lieu of the combination temperature and pressure sensor 134.

The EGR flow passage feeds into an EGR mixer 114 that is located downstream of a throttle 112 and upstream of the intake manifold 104 in the illustrated implementation. The EGR mixer 114 is in the engine intake system, fluidically connected to the throttle 112, the intake manifold 104, and the EGR flow passage 108. The fluid connections can be made with conduits containing flow passages that allow fluid flow. In some implementations, the EGR mixer 114 can be included within a conduit connecting the intake manifold 104 to the throttle 112, within the intake manifold 104 itself, within the EGR flow passage 108, integrated within the throttle 112, or integrated into the EGR throttle valve 126. Additional sensors and sensing ports can be included within various parts of the EGR mixer 114. Details about an example EGR mixer 114 are described later within this disclosure.

In the illustrated implementation, an exhaust gas cooler 110 is positioned in the EGR flow passage 108 between the exhaust manifold 106 and the EGR mixer 114. The exhaust gas cooler 110 can operate to lower a temperature of the exhaust gas prior to the EGR mixer 114 and EGR throttle valve 126. The exhaust gas cooler 110 is a heat exchanger, such as an air to air exchanger or an air to water exchanger. Optionally, some implementations may omit the exhaust gas cooler 110.

In some implementations, the engine system 100 includes a compressor 118 upstream of the throttle 112. In an engine with a compressor 118 but no throttle, such as an unthrottled diesel engine, the throttle is not needed and the mixer, in some implementations, is downstream of the compressor. In some implementations, the compressor 118 includes a centrifugal compressor, a positive displacement compressor, or another type of compressor for increasing a pressure within the EGR flow passage 108 during engine operation. In some implementations, the engine system 100 includes an intercooler 120 that is configured to cool the compressed air prior to the air entering the manifold. In the illustrated implementation, the compressor 118 is part of a turbocharger. That is, a turbine 122 is located downstream of the exhaust manifold 106 and rotates as the exhaust gas expands through the turbine 122. The turbine 122 is coupled to the compressor 118, for example, via a shaft 124 and imparts rotation on the compressor 118. While the illustrated implementation utilizes a turbocharger to increase the intake manifold pressure, other methods of compression, in certain instances, are used, for example an electric or engine powered compressor (e.g., supercharger). In some implementations, a separate controller 130 or engine control unit (ECU) is used to control and detect various aspects of the system operation. For example, the controller 130 can adjust air-fuel ratios, spark timing, and EGR flow rates based on current operating conditions and parameters sensed by various sensors.

Figure 2:
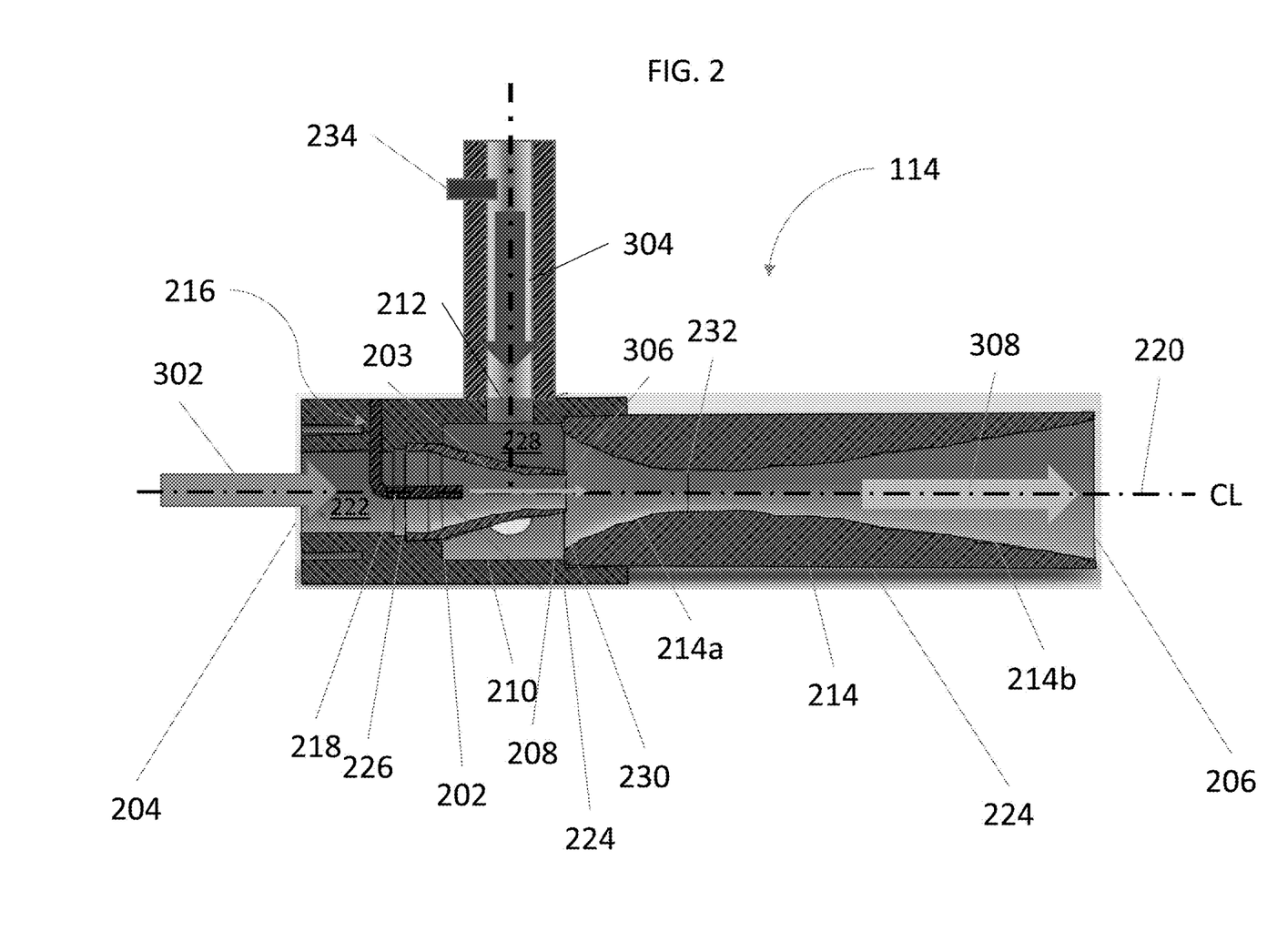
FIG. 2 is a side, half cross-sectional view schematic diagram of an example exhaust gas recirculation (EGR) mixer.

FIG. 2 is a side, half cross-sectional view schematic diagram of an example EGR mixer 114. The EGR mixer 114 is made up of one or more housings or casings. Openings in the end walls of the casings define an air inlet 204 and an outlet 206 of an interior flow passage 222 defined by casing(s) 224. The interior flow passage 222 directs flow from the air inlet 204 to the outlet 206 to allow flow through the EGR mixer 114. Within the casing(s) 224, the EGR mixer 114 includes a convergent nozzle 202 in a flow path from the air inlet 204 of the EGR mixer 114 and the outlet 206 of the EGR mixer 114. The convergent nozzle 202 includes a convergent portion 203 that converges in the direction of flow toward a convergent end 208. That is, the downstream end (outlet) of the convergent nozzle 202 has a smaller cross-sectional area, i.e., a smaller flow area, than the upstream end (inlet) 226 of the convergent nozzle 202. In some implementations, the convergent nozzle includes portions that do not converge, but remain relatively straight without changing a cross-sectional flow area. Such sections, in certain instances, are used to retain the convergent nozzle 202 within the EGR mixer 114. The EGR mixer 114 includes an exhaust gas receiver housing 210 and the exhaust gas receiver housing 210 includes one or more exhaust gas inlets 212 fed from and fluidically connected to the EGR flow passage 108 and into an interior receiver cavity 228 of the exhaust gas receiver housing 210. In the illustrated implementation, the exhaust gas receiver housing 210 surrounds the convergent nozzle 202, such that a portion of the convergent nozzle 202 is within the interior receiver cavity 228. The convergent nozzle 202 is positioned to form a free jet of gas out of the convergent end 208 of the convergent nozzle 202. Also, the exhaust gas inlet 212 is upstream of the convergent end 208 of the convergent nozzle 202. While the illustrated implementation shows the convergent nozzle 202 to be at least partially within the exhaust gas receiver housing 210, other designs can be utilized. In some implementations, the air inlet 204 and the outlet 206 are provided with attachments or fittings to enable connection to the intake manifold 104 of the engine block 102 and/or the EGR mixer 114. In some instances, the convergent nozzle 202 is modularly interchangeable with nozzles with a different inlet area 226 and/or convergent end 208, making the system readily changeable to fit multiple engine sizes. For example, in certain instances, the convergent nozzle 202 is provided with threads or another form of a removable attachment to the remainder of the mixer casing(s) 224.

A convergent-divergent nozzle 214 is downstream of the convergent portion 203 of the convergent nozzle 202 and is fluidically coupled to receive fluid flow from the convergent end 208, the exhaust gas inlet 212, and, in certain instances, a fuel supply 216. In other words, the convergent-divergent nozzle 214 can act as an air-fuel-exhaust gas inlet for the intake manifold 104. To help facilitate mixing, an inlet 230 of the convergent-divergent nozzle 214 has a greater area than an exit of the convergent nozzle 202. The convergent-divergent nozzle 214 includes three parts: the inlet 230, the throat 232, and the outlet 206. The throat 232 is the narrowest point of the convergent-divergent nozzle 214 and is located and fluidically connected downstream of the inlet 230 of the convergent-divergent nozzle 214. The narrowing of the convergent-divergent nozzle 214 at the throat 232 increases a flow velocity of a fluid flow as it passes through the convergent-divergent nozzle 214. The outlet 206 of the convergent-divergent nozzle 214 is fluidically connected to and upstream of the intake manifold 104. Between the throat 232 and the outlet 206, the cross-section of the flow passage through the convergent-divergent nozzle 214 increases. The increase in cross-sectional area slows the flow velocity and raises the pressure of the fluid flow. In certain instances, the increase in cross-sectional area is sized to increase a pressure within the EGR mixer 114 so that the pressure drop across the EGR mixer 114 is zero, nominal, or otherwise small. In some implementations, the convergent-divergent nozzle 214 includes threads or another form of removable attachment at the inlet 230, the outlet 206, or both to allow the convergent-divergent nozzle 214 to be installed and fluidically connected to the remainder of the intake of the engine system 100. Like the convergent nozzle 202, the convergent-divergent nozzle 214, in certain instances, is modularly interchangeable with convergent-divergent nozzle 214 of the different inlet 230, throat 232, and outlet 206 areas to make the system readily changeable to fit multiple engine sizes.

The illustrated implementation shows the convergent nozzle 202 and the convergent-divergent nozzle 214 aligned at a same center axis 220, but in some implementations, the center axis of the convergent nozzle 202 and the convergent-divergent nozzle 214 might not be aligned or parallel. For example, space constraints may require the EGR mixer 114 to have an angle between the axis of the convergent nozzle 202 and the convergent-divergent nozzle 214. In some implementations, rather than having a substantially straight flow passage as shown in FIG. 2, the flow passage may be curved.

As illustrated, the fuel supply 216 includes a fuel supply tube 218 terminating parallel and centrally within the air flow path. The fuel supply tube 218 is configured to supply fuel into the air flow path in a direction of flow through the EGR mixer 114, and upstream of the convergent portion 203 of the convergent nozzle 202. In some implementations, the fuel supply tube 218 is a gaseous fuel supply tube, coupled to a source of gaseous fuel. However, the fuel delivered by the fuel supply tube 218 is capable of supplying any combustible fluid, such as natural gas, gasoline, or diesel to name a few examples. While shown as a single tube, the fuel supply tube 218, in certain instances, is configured in other ways, for example, as a cross through the flow area of the mixer, as fuel delivery holes along the perimeter of the flow area, or in another manner. While the illustrated implementation shows a fuel supply tube 218 configured to inject fuel upstream of the convergent portion 203 of the convergent nozzle 202, fuel can also be added with a fuel supply port 234 upstream of the exhaust gas inlet 212. That is, in certain instances, fuel is injected into the EGR stream. In some implementations, such a port includes a gaseous fuel supply port. In some instances, the fuel is delivered at high velocity, with velocities up to and including sonic flow at the fuel supply tube 218, such that a fuel/air jet pump is also created, allowing the fuel to provide additional motive force for the primary air flow into and thru the nozzle. In such a case, higher pressure, such that a sonic jet, is generated, further enhances mixing of the fuel and air. This reduces the need for the fuel pressure regulator as such if flow is inherently choked. Additionally, if the fuel jet is cooled via the Joules-Thompson effect, it will cool the air/fuel stream, thus reducing the air path charge air cooler heat removal requirements as well. Alternatively or in addition, in some implementations, fuel is added upstream of the throttle 112.

The illustrated implementation operates as follows. The convergent portion 203 of the convergent nozzle 202 increases a velocity and decreases a pressure of an air flow 302 in the EGR mixer 114. An exhaust flow 304 is drawn into the EGR mixer 114 through the exhaust gas inlet 212 in response to (e.g., because of) the decreased pressure of the free jet air flow 302 exiting the convergent nozzle 202. The exhaust flow 304 is directed from the exhaust manifold 106 eventually to the point downstream of the convergent portion 203 of the convergent nozzle 202. The air flow 302, the exhaust flow 304, and a fuel flow 306 are mixed to form a combustion mixture 308 with a second convergent nozzle 214a positioned downstream of the convergent portion 203 of the convergent nozzle 202. A pressure of the combustion mixture 308 is increased and a velocity of the combustion mixture 308 is reduced with a divergent nozzle 214b. While the second convergent nozzle 214a and the divergent nozzle 214b are illustrated as a single convergent-divergent nozzle 214, the second convergent nozzle 214a and the divergent nozzle 214b, in some implementations, are separate and distinct parts.

In the illustrated implementation, the fuel flow 306 is supplied into the air flow 302 with a fuel supply tube 218 parallel and in-line with a center of an air flow passage. The fuel flow 306 is supplied upstream of the convergent portion 203 of the convergent nozzle 202. In some implementations, the fuel flow 306 is supplied into the exhaust flow 304 with a fuel supply port. Regardless of the implementation used, the fuel flow 306 sometimes includes a gaseous fuel flow. In some implementations, the fuel flow 306 has an injection velocity higher than an air flow 302 velocity. Such a high velocity can aid in mixing the air flow 302, fuel flow 306, and exhaust flow 304.

In some implementations, the throat 232 of the convergent-divergent nozzle 214 has a cross-sectional flow area that is larger than the cross sectional flow area of the convergent end 208 of the convergent nozzle 202. For example, in some implementations, the smallest flow area of the throat 232 of the convergent-divergent nozzle 214 is 1.1-3 times the smallest flow area of the convergent end 208 of the convergent nozzle 202. In general, efficient performance is achieved when the throat 232 is sized such that the two fluid streams can pass through the throat 232 at roughly the same velocity. For example, in a case of 25% EGR at 120° C., the throat 232 area is about 1.5 times the flow area of the convergent end 208 of the convergent nozzle 202.

Figure 3:
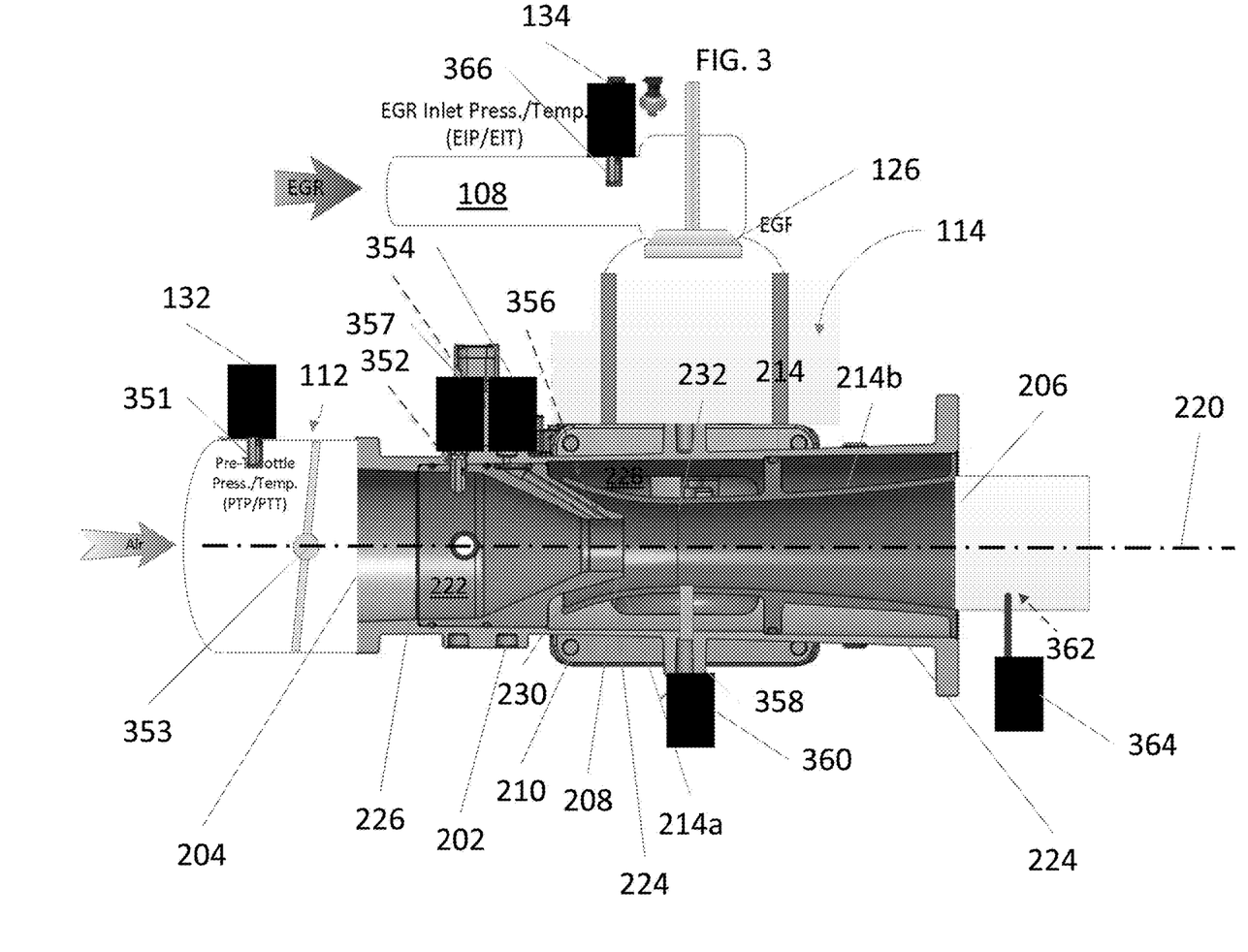
FIG. 3 is a side, half cross-sectional view schematic diagram of an example EGR mixer and throttle with sensors and sensing ports.

FIG. 3 is a side, half cross-sectional view schematic diagram of an example EGR mixer 114 with sensors and sensing ports. A first pressure port 351 is positioned upstream of the throttle 112. The first pressure port 351 provides a location to sense a pressure and a temperature upstream of the convergent nozzle 202 by allowing fluid communication between the interior flow passage 222 and the combination temperature and pressure sensor 132. The throttle 112 includes a position sensor 353. The position sensor detects the position of the throttle 112 and, in certain instances includes an encoder, a Hall Effect sensor, optical sensor, or any other type of sensor with sufficient accuracy and precision. Based on information, or streams, provided by these sensors (132 and 353), an estimated pressure drop, or pressure downstream of the throttle 112, is calculated based on a model of the throttle flow characteristics. This approach can yield results accurate enough for MAF calculations when the throttle is in the closed or nearly closed position (e.g., when the throttle is in the closed to 10% open range).

In some implementations, a second pressure port 352 is positioned upstream of the convergent portion 203 of the convergent nozzle 202 and downstream of the throttle 112. The second pressure port 352 provides a location to sense pressure upstream of the convergent nozzle 202 and downstream of the throttle 112 by allowing fluid communication between the interior flow passage 222 and a second pressure sensor 357. In instances where the second pressure port 352 and the second pressure sensor 357 are used, the pressure downstream of the throttle 112 can be compared to the calculated pressure downstream of the throttle 112. In such an implementation, a correction table can be used to adjust the calculated airflow, or the calculated pressure downstream of the throttle 112 can be replaced by the sensed pressure downstream of the throttle 112.

A third pressure port 356 is positioned after the convergent portion 203 of the convergent nozzle 202, for example at the convergent end 208. The third pressure port 356 provides a location to sense pressure at a convergent end 208 of the convergent nozzle 202 by allowing fluid communication between the interior flow passage 222 and a pressure sensor 354. As illustrated, the third pressure port 356 is integrated into the convergent nozzle 202, but a separate, discrete sensing port can be used with similar results. Based on information, or streams, provided by sensors 132 and 354, an estimated pressure drop, or pressure downstream of the throttle 112, is calculated based on a model of the convergent nozzle flow characteristics. This approach can yield results accurate enough for MAF calculations when the throttle 112 is in the open or nearly opened position (e.g., when the throttle is in the open to 60% open range).

In some implementations, a fourth pressure port 358 is positioned in the throat 232 of the convergent-divergent nozzle 214. The fourth pressure port 358 provides a location to sense a pressure within the throat 232 of the convergent-divergent nozzle 214 by allowing fluid communication between the interior flow passage 222 and a pressure sensor 360.

A fifth pressure port 362 is positioned downstream of the throat 232 of the convergent-divergent nozzle 214, for example, within the intake manifold 104. The fifth pressure port 362 provides a location to sense a pressure downstream of the convergent-divergent nozzle 214 by allowing fluid communication between the interior flow passage 222 and a pressure sensor 364. In some implementations, the pressure sensor 364 is the MAP sensor.

A sixth pressure port 366 is positioned upstream of the EGR throttle valve 126. The sixth pressure port 366 provides a location to sense a pressure and temperature upstream of the EGR throttle valve 126 by allowing fluid communication between the EGR flow passage 108 and a combination temperature and pressure sensor 134. In some implementations, EGR flow is calculated based in part on measurements provided by the combination temperature and pressure sensor 134.

In addition to the MAF calculations previously described, in certain implementations, an air-fuel-exhaust mass flow rate is determined by comparing the pressure sensed by the pressure sensor 360 and the pressure sensor 364. A difference between the mass air-flow rate and the air-fuel-exhaust flow rate, in some instances, is used to calculate an EGR mass flow rate. In certain instances, such a calculation, in some instances, are performed by the controller 130 (FIG. 1). In some instances, The MAF and EGR flow rates are used as inputs for the controller to adjust a variety of parameters within the engine system 100. In certain instances, the controller 130 is an engine control unit (ECU) that controls some or all aspects of the engine system's 100 operation, such as fuel supply, air, ignition and/or other engine operational parameters. In certain instances, the controller 130 is a separate control unit from the engine system's ECU. The controller 130 also need not send actuation and/or control signals to the engine system 100, but could instead provide information, such as the MAF and EGR flow rates, to an ECU for use by the ECU in controlling the engine system 100.

Figure 4:
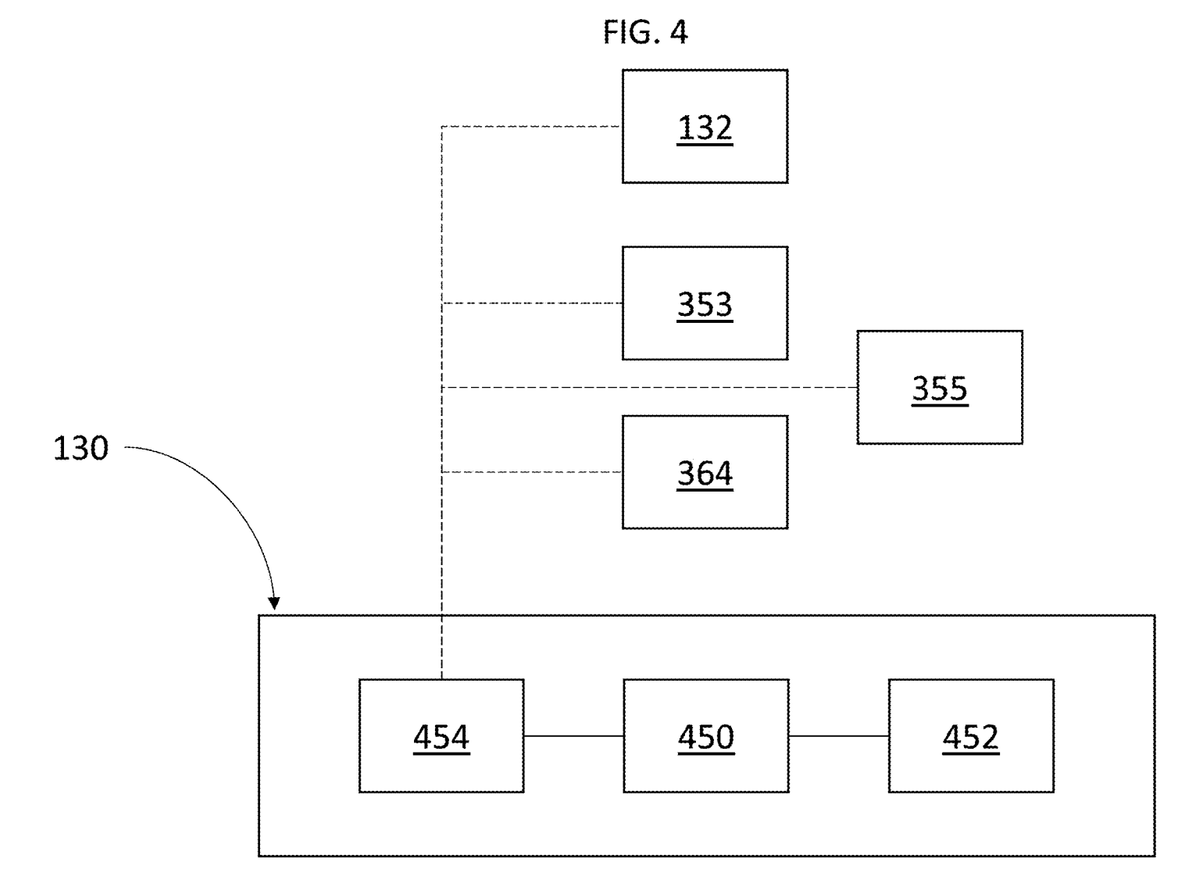
FIG. 4 is a block diagram of an example controller that can be used with aspects of this disclosure.

FIG. 4 is a block diagram of an example controller 130 that can be used with aspects of this disclosure. The controller 130 can, among other things, monitor parameters of the system and send signals to actuate and/or adjust various operating parameters of the system. As shown in FIG. 4, the controller 130, in certain instances, includes a processor 450 (e.g., implemented as one processor or multiple processors) and a memory 452 (e.g., implemented as one memory or multiple memories) containing instructions that cause the processors 450 to perform operations described herein. The processors 450 are coupled to an input/output (I/O) interface 454 for sending and receiving communications with components in the system, including, for example, the combination temperature and pressure sensor 132, the position sensor 353, and the pressure sensors 354 and 364. In certain instances, the controller 130 can additionally communicate status with and send actuation and/or control signals to one or more of the various system components (including the throttle 112 and the EGR throttle valve 126) of the engine system 100, as well as other sensors (e.g., pressure sensors, temperature sensors, knock sensors, and other types of sensors) provided in the engine system 100.

Figure 5:
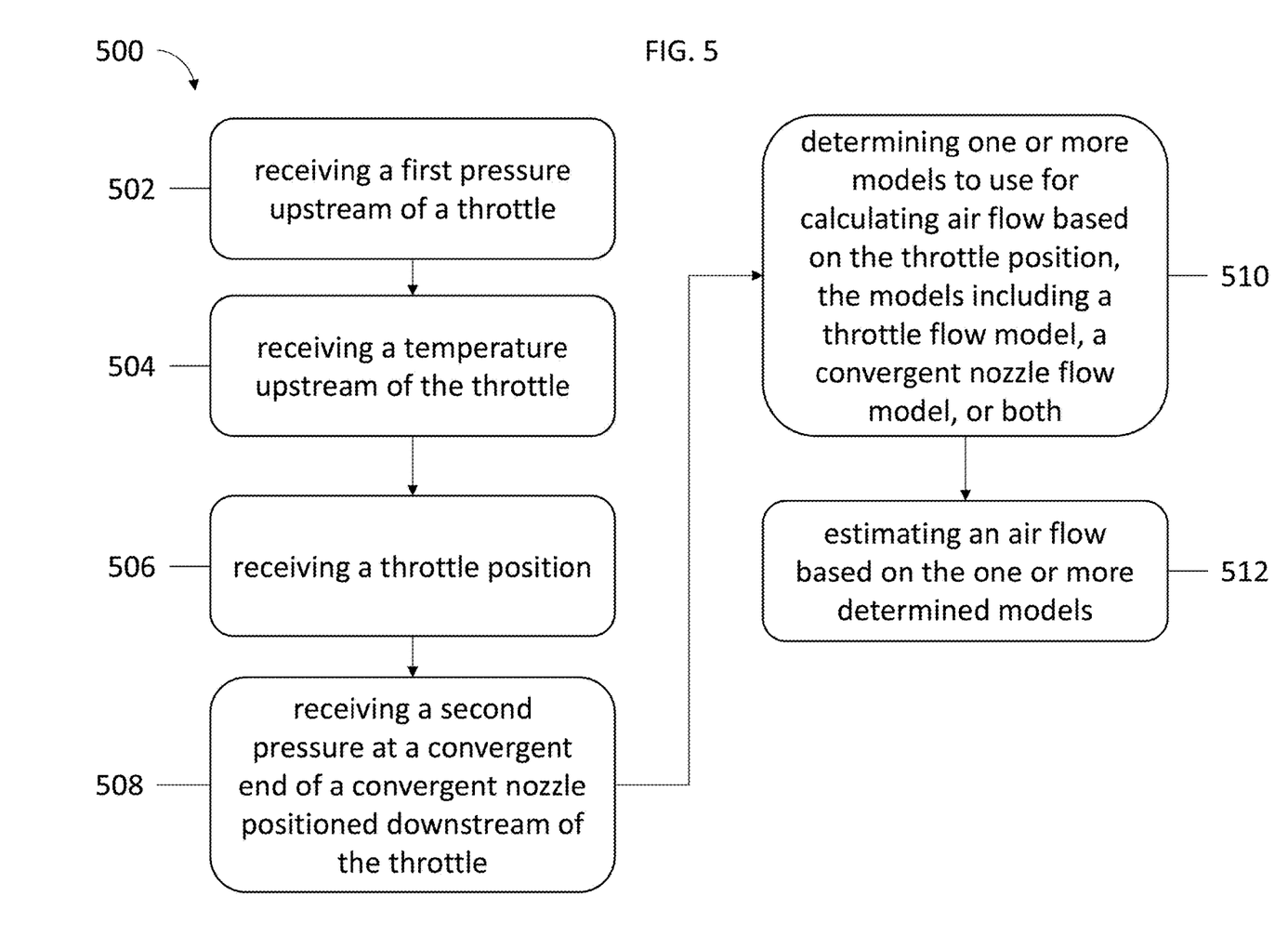
FIG. 5 is a flowchart of an example method that can be used with aspects of this disclosure.

FIG. 5 is a flowchart of a method 500 that can be performed all or in part by the controller 130. At 502, a first pressure stream, corresponding to a first pressure upstream of the throttle 112, is received by the controller 130. At 504, a temperature stream corresponding to a temperature upstream of the throttle is received by the controller 130. At 506, a throttle position stream, corresponding to a throttle position, is received by the controller 130. At 508, a second pressure stream, corresponding to a second pressure at a convergent end 208 of a convergent nozzle 202 positioned downstream of the throttle 112, is received by the controller 130. After the streams are received by the controller 130, at 510, the controller 130 determines one or more models to use for calculating a mass air flow based on the throttle position. The controller 130 chooses between a throttle flow model, a convergent nozzle flow model, or both. Based on the one or more determined flow models, at 512, the controller 130 estimates the mass air flow based on the one or more determined models.

To determine which model to use for calculating mass air flow, the controller 130 determines a ratio of a throttle flow model to a convergent nozzle flow model based on the throttle position stream. For example, if the throttle 112 is in a closed or near-closed position, then the throttle flow model will be more heavily weighted than the convergent nozzle flow model. Conversely, if the throttle 112 is in an open or near-open position, then the convergent nozzle flow model will be more heavily weighted than the throttle flow model. Based on the throttle flow model, the air flow is calculated using the first pressure stream, the temperature stream, and the throttle position stream. In other words, a differential pressure across the throttle 112 is calculated by the controller 130 based on the first pressure stream, the temperature stream, and the throttle position stream. Based on the convergent nozzle flow model, the air flow is calculated using the first pressure stream, the second pressure stream, and the temperature stream. Once the controller 130 has calculated the airflow based on both of the flow models, the controller 130 blends the calculated air flows of both the throttle flow model and the convergent nozzle flow model based on the determined ratio. The controller 130 then determines an estimated airflow based on the blended calculated air flows.

In some implementations, the controller 130 receives a third pressure stream from a third pressure sensor 360. The third pressure stream corresponds to a third pressure at a throat 232 of a convergent-divergent nozzle 214 downstream of the convergent nozzle 202. The controller 130 can also receive a fourth pressure stream from a fourth pressure sensor 364. The fourth pressure stream corresponds to a fourth pressure downstream of the convergent-divergent nozzle 214, for example, within the intake manifold 104 (FIG. 1). In some implementations, the fourth pressure sensor 364 is the MAP sensor. Based on the third pressure stream and the fourth pressure stream, the controller 130 can determine a combined air flow, recirculated exhaust gas flow, and fuel flow. In some instances, the controller 130 can determine a calculated MAP value based on the calculated air flow. In such instances, the calculated MAP can be compared to the measured MAP, and differences can be rectified by the controller 130 with a compensation table. In some implementations, the compensation table is used to capture system uncertainties and more complex system dynamics. Such variables can be difficult to capture in simple one dimensional due to fidelity limitations.

In certain instances, the controller 130 can control many aspects of the internal combustion engine system 100 (FIG. 1). For example, the controller 130 can send a signal to a fuel injector or multiple injectors. Such a signal corresponds to an amount of fuel to inject into an intake fluid stream. The amount of fuel is based on the estimated air flow, the combined air flow and recirculated gas exhaust flow, a target air-fuel ratio, or a combination. Target air-fuel ratio values corresponding to various parameters, in certain instances, is stored on a table within the memory 452 of the controller 130, or, in certain instances, is calculated based on engine parameters, for example, with a PID controller.

In some implementations, the temperature stream is a first temperature stream. The controller 130 can receive a fifth pressure stream corresponding to a pressure upstream of an EGR throttle valve 126. The controller 130 can receive a second temperature stream corresponding to a temperature upstream of the EGR throttle valve 126. In such implementations, the controller 130 sends a signal to the EGR throttle valve 126. The signal corresponds to an amount of EGR to inject into an intake fluid stream. In such instances the amount of EGR is at least partially determined based on the estimated air flow, the fifth pressure stream, the second temperature stream, or a combination.

While this disclosure contains many specific implementation details, these should not be construed as limitations on the scope of what may be claimed, but rather as descriptions of features specific to particular implementations of particular subject matters. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple products.

A number of implementations of the subject matter have been described. Nevertheless, it will be understood that various modifications may be made. Accordingly, other implementations are within the scope of the following claims.

What is claimed is:

1. A method of controlling an internal combustion engine system, the method comprising:
   receiving a value of a first pressure upstream of a throttle;
   receiving a value of a temperature upstream of the throttle;
   receiving a value of a throttle position;
   receiving a value of a second pressure at a convergent end of a convergent nozzle positioned downstream of the throttle; and
   estimating an air flow based on the received first pressure, the received temperature, the received throttle position, and the received second pressure, wherein estimating the air flow comprises:
      determining one or more models to use for calculating air flow based on the throttle position, the models including a throttle flow model, a convergent nozzle flow model, or both.

2. The method of claim 1, wherein estimating the air flow comprises:
   calculating an air flow based on the throttle flow model using the received first pressure, the received temperature, and the received throttle position.

3. The method of claim 1, wherein estimating the air flow comprises:
   calculating an air flow based on the convergent nozzle flow model using the received first pressure, the received temperature, the received second pressure, and the received throttle position.

4. The method of claim 1, wherein determining which model to use comprises:
   determining a ratio of a throttle flow model to a convergent nozzle flow model based on the throttle position.

5. The method of claim 4, wherein estimating the air flow comprises:
   calculating an air flow based on the throttle flow model using the received first pressure and the received temperature;
   calculating an air flow based on the convergent nozzle flow model using the received first pressure and the received temperature;
   blending the calculated air flows of the throttle flow model and the convergent nozzle flow model based on the determined ratio; and
   determining an estimated air flow based on the blended calculated air flows.

6. The method of claim 1, further comprising:
   receiving a value of a third pressure corresponding to a pressure at a throat of a convergent-divergent nozzle downstream of the convergent nozzle;
   receiving a value of a fourth pressure corresponding to a pressure downstream of the convergent-divergent nozzle; and
   determining a combined air flow, recirculated exhaust gas flow, and fuel flow based on the third pressure and the fourth pressure.

7. The method of claim 6, comprising injecting an amount of fuel into an intake fluid stream, the amount of fuel being based on the estimated air flow, the combined air flow and recirculated gas exhaust flow, a target air-fuel ratio, or a combination.

8. The method of claim 1, comprising injecting an amount of recirculated exhaust gas into an intake fluid stream, the amount of recirculated exhaust gas being at least partially determined based on the estimated air flow.

9. The method of claim 1, further comprising calculating a differential pressure across the throttle based on the received first pressure, the received temperature, and the received throttle position.

10. An engine system comprising:
an intake manifold configured to receive a combustible mixture configured to be combusted within a combustion chamber;
a throttle upstream of the intake manifold, the throttle configured to at least partially regulate an air flow into the intake manifold;
an exhaust manifold configured to receive combustion products from the combustion chamber; and
an exhaust gas recirculation mixer system downstream of the throttle and upstream of an intake manifold, the exhaust gas recirculation mixer comprising:
an exhaust gas housing comprising an exhaust gas inlet into an interior of the exhaust gas housing;
a mixer housing;
a convergent nozzle in the mixer housing and in a flow path from an air inlet of the mixer to an outlet of the mixer, the convergent nozzle converging toward the outlet of the mixer;
a first pressure port positioned upstream of the throttle, the first pressure port providing a location to sense a first pressure upstream of the throttle; and
a second pressure port positioned at a convergent end of the convergent nozzle, the second pressure port providing a location to sense a second pressure at the convergent end of the convergent nozzle;
a controller configured to:
receive a first pressure stream from a first pressure sensor at the first pressure port, the first pressure stream corresponding to a first pressure upstream of a throttle;
receive a temperature stream from a temperature sensor at the first pressure port, the temperature stream corresponding to a temperature upstream of the throttle;
receive a throttle position stream from an encoder coupled to the throttle, the throttle position stream corresponding to a throttle position;
receive a second pressure stream from a second pressure sensor at the second pressure port, the second pressure stream corresponding to a second pressure at the convergent end of the convergent nozzle; and
estimate an air flow based on the first pressure stream, the temperature stream, the throttle position stream, and the second pressure stream.

11. The engine system of claim 10, wherein the controller is further configured to estimate the air flow with the following steps:
determine a blending ratio of a throttle flow model to a convergent nozzle flow model based on the throttle position stream;
calculate an air flow based on the throttle flow model using the first pressure stream, the throttle position stream, and the temperature stream;
calculate an air flow based on the convergent nozzle flow model using the first pressure stream, the second pressure stream, and the temperature stream;
blend the calculated air flows of the throttle flow model and the convergent nozzle flow model based on the determined blending ratio; and
determine an estimated airflow based on the blended calculated air flows.

12. The engine system of claim 10, wherein the temperature stream is a first temperature stream, the controller further configured to:
receive a fifth pressure stream corresponding to a pressure upstream of an exhaust gas inlet;
receive a second temperature stream corresponding to a temperature upstream of an exhaust gas inlet; and
send a signal to an exhaust gas recirculation valve, the signal corresponding to an amount of recirculated exhaust gas to inject into an intake fluid stream, the amount of recirculated exhaust gas being at least partially determined based on the estimated air flow.

13. The engine system of claim 10, further comprising:
a convergent-divergent nozzle in the mixer housing and comprising an air-exhaust gas inlet in fluid communication to receive fluid flow from the convergent nozzle and from the interior of the exhaust gas housing;
a third pressure port positioned in a throat of the convergent-divergent nozzle, the third pressure port providing a location to sense a third pressure within the throat of the convergent-divergent nozzle; and
a fourth pressure port positioned downstream of the convergent-divergent nozzle, the fourth pressure port providing a location to sense a third pressure downstream of the convergent-divergent nozzle;
the controller further configured to:
receive a third pressure stream from a third pressure sensor located at the third pressure port, the third pressure stream corresponding to a third pressure at the throat of the convergent-divergent nozzle;
receive a fourth pressure stream from a fourth pressure sensor located at the fourth pressure port, the fourth pressure stream corresponding to a fourth pressure downstream of the convergent-divergent nozzle; and
determine a combined air flow, recirculated exhaust gas flow, and fuel flow based on the third pressure stream and the fourth pressure stream.

14. The engine system of claim 13, wherein the controller is further configured to send a signal to a fuel injector, the signal corresponding to an amount of fuel to inject into an intake fluid stream, the amount of fuel being at least partially based on the estimated air flow, the combined air flow and recirculated gas exhaust flow, a target air-fuel ratio, or a combination.

15. An engine system controller configured to:
receive a first pressure stream corresponding to a first pressure upstream of a throttle;
receive a temperature stream corresponding to a temperature upstream of the throttle;
receive a throttle position stream corresponding to a throttle position;
receive a second pressure stream corresponding to a second pressure at a convergent end of a convergent nozzle positioned downstream of the throttle;
determine one or more models to use for calculating air flow based on the throttle position, the models including a throttle flow model, a convergent nozzle flow model, or both; and estimate an air flow based on the one or more determined models.

16. The controller of claim 15, wherein to determine the one or more models to use for calculating air flow comprises the controller being further configured to:
determine a ratio of a throttle flow model to a convergent nozzle flow model based on the throttle position stream;
calculate an air flow based on a throttle flow model using the first pressure stream, the temperature stream, and the throttle position stream;
calculate an air flow based on a convergent nozzle flow model using the first pressure stream, the second pressure stream, and the temperature stream;
blend the calculated air flows of the throttle flow model and the convergent nozzle flow model based on the determined ratio; and
determine an estimated airflow based on the blended calculated air flows.

17. The controller of claim 15, wherein the controller is further configured to:
receive a third pressure stream from a third pressure sensor, the third pressure stream corresponding to a third pressure at a throat of a convergent-divergent nozzle downstream of the convergent nozzle;
receive a fourth pressure stream from a fourth pressure sensor, the fourth pressure stream corresponding to a fourth pressure downstream of the convergent-divergent nozzle; and
determine a combined air flow, recirculated exhaust gas flow, and fuel flow based on the third pressure stream and the fourth pressure stream.

18. The controller of claim 17, further configured to send a signal to a fuel injector, the signal corresponding to an amount of fuel to inject into an intake fluid stream, the amount of fuel being based on the estimated air flow, the combined air flow and recirculated gas exhaust flow, a target air-fuel ratio, or a combination.

19. The controller of claim 15, wherein the temperature stream is a first temperature stream, the controller further configured to:
receive a fifth pressure stream corresponding to a pressure upstream of an exhaust gas recirculation valve;
receive a second temperature stream corresponding to a temperature upstream of the exhaust gas recirculation valve; and
send a signal to the exhaust gas recirculation valve, the signal corresponding to an amount of recirculated exhaust gas to inject into an intake fluid stream, the amount of recirculated exhaust gas being at least partially determined based on the estimated air flow, the fifth pressure stream, the second temperature stream, or a combination.

20. The controller of claim 15, wherein the controller is further configured to calculate a differential pressure across the throttle based on the first pressure stream, the temperature stream, and the throttle position stream.

* * * * *